2,963,043

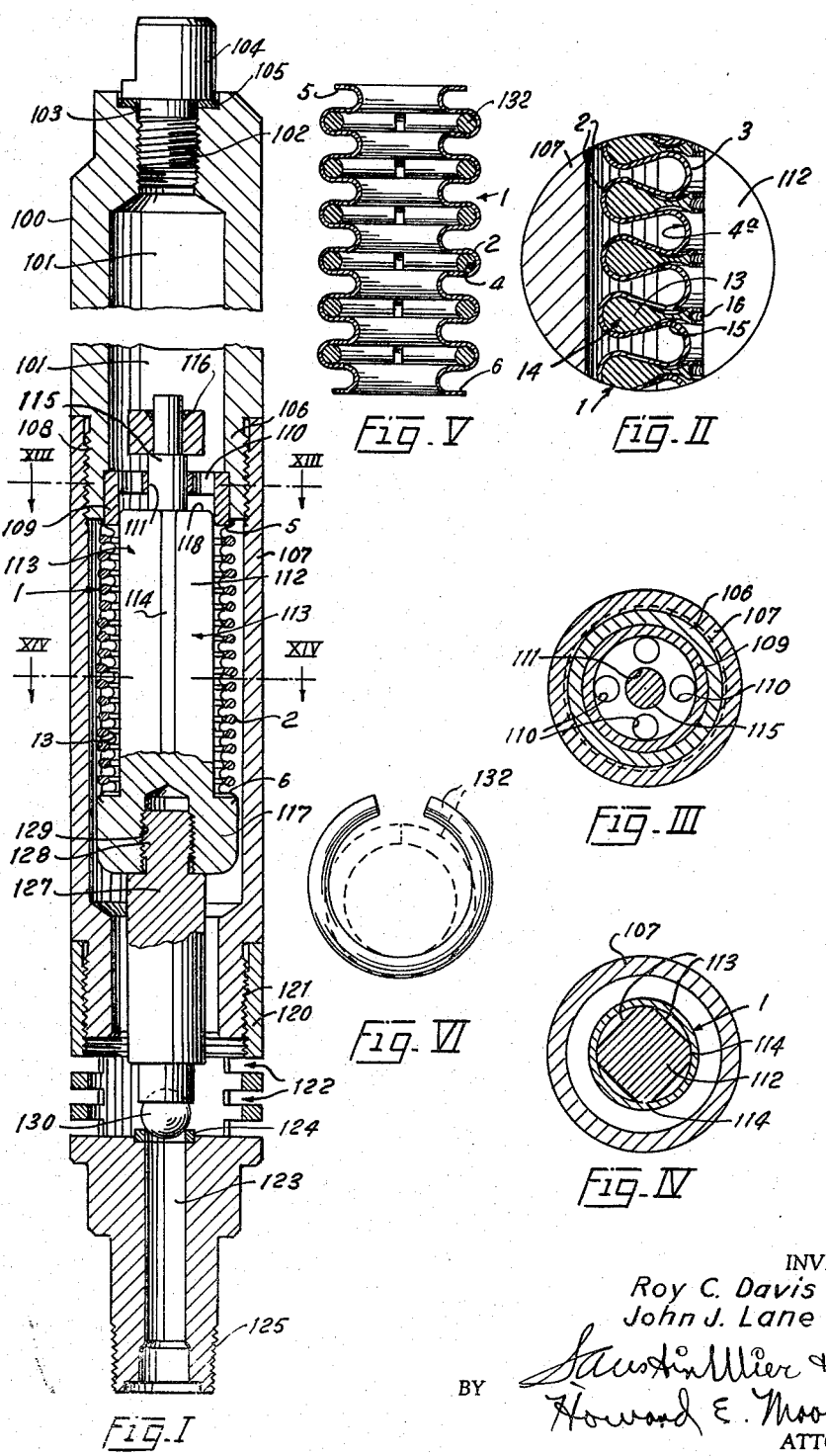

PRESSURE RESPONSIVE DEVICE

Roy C. Davis and John J. Lane, Dallas, Tex., assignors, by mesne assignments, to The Guiberson Corporation, Dallas, Tex., a corporation of Texas Filed Aug. 5, 1955, Ser. No. 526,662

4 Claims. (Cl. 137—786)

This invention is concerned with a method and means for supporting and protecting a bellows diaphragm against damage by excessive pressure differentials thereacross.

A typical bellows diaphragm, used as an elastic element in valves and other control regulation, measuring and joinder devices, is usually made of three plies of Monel metal, pressed together, and formed into a generally cylindrical hollow spring-like member having alternate inner and outer corrugations spaced longitudinally thereof. Each ply of metal is approximately .005 to .007 of an inch thick. The metal bellows, so formed, is usually attached between two elements requiring relative longitudinal or lateral movement therebetween.

A typical use for such bellows is in a surface controlled flow valve like that shown in U.S. Patent No. 2,519,242, issued to H. U. Garrett et al., on August 15, 1950, which is mounted on the outside of the tubing in a well in communication with the interior of the tubing. The bellows diaphragm, which is employed as a spring element to control the movement of the valve stem, is charged with a predetermined charge of gas under pressure to extend the bellows axially to hold the valve stem in normally closed position. The bellows is caused to contract axially by subjecting it to a pressure injected into the well casing, which pressure is greater than the internal pressure in the bellows, to thereby open the valve.

The thin flexible bellows are actually capable of withstanding a differential in pressure up to approximately 400 p.s.i., without any means to support the corrugations of the bellows internally.

In normal operation of such a flow valve, the bellows is subjected to differentials in pressure of the order of approximately 12 p.s.i. per 100 p.s.i. of working pressure, or a total of from 25 to 120 p.s.i. Differential is measured between the internal pressure to which the valve is charged and the outside injected pressure However, the bellows in the valve is actually subjected to much higher differentials in pressure while being installed and under certain conditions after installation.

For instance, when the valve is originally run into the well on the tubing, there is usually present in the well a column of oil, salt water or mud which exerts a hydrostatic pressure of from .4 to .8 p.s.i. per foot of depth, averaging about .5 p.s.i. per foot.

By way of illustration, it can readily be seen that a flow valve with the bellows charged with an internal pressure of 700 p.s.i., run to the bottom of a 5000 foot well, would be subjected to a differential across the bellows of approximately 1800 p.s.i. Deeper wells with heavier mud would obviously increase this differential.

It may also be desirable to subject the flow valve to extreme differentials in pressure after the valves have been installed in the well.

For instance, the widespread practice of remedial and completion processes, such as acidization and hydraulic fracturing, require the subjection of the producing formations in the well to extremely high pressures which would subject the flow valves, if disposed in the well, to extremely high pressure differentials. Heretofore, during these operations it was either necessary to remove the flow valves to protect them against damage, or limit the pressures applied to the formations to such an extent as to protect the flow valves against too high pressure differential, thereby limiting the effectiveness of the process.

Therefore, there is a definite need for better means to protect the bellows in a flow valve against damage by abnormally high differentials in pressure, and yet remain stable in the operating ranges of pressure.

The original mechanical strength of the bellows structure may be such that these abnormal differentials would not actually cause the bellows to fail structurally and leak; but such differentials in pressure may cause deformation of the convolutions of the bellows, thus changing the operating characteristics of the valve.

It will be apparent that if the opening pressure and/or the closing pressure of the flow valve changes, then the value of the valve is lost. Slight deformation and mechanical change in the bellows will cause a correspondingly greater change in the operating characteristics of the valve.

Attempts have been made in the past to protect the bellows against abnormal differentials in pressure.

One means which has met with limited success is that disclosed in the aforesaid Garrett patent, wherein an internal valve is provided between a pressure chamber and the interior of the bellows to be closed upon maximum open position of the valve to trap an incompressible liquid inside the bellows in an attempt to protect the bellows against distortion by abnormal differentials in pressure.

This type of protection has three fundamental weaknesses, namely: (1) The internal valve is susceptible to leakage, which is proportional to the pressure differential thereacross and the time which the valve is required to hold the pressure. It is apparent that leakage of the internal valve, permitting gas to intermingle with the liquid and the leakage of the liquid into the pressure chamber would allow distortion of the corrugations of the bellows when subjected to abnormal pressures, thereby changing the working characteristics of the bellows; (2) some gas is always trapped with the liquid inside the bellows, which would not give complete protection to the bellows, and would allow distortion of the corrugations; (3) the individual corrugations of the bellows are not independently protected. Under overloaded conditions the configuration of the bellows would be such as to deform one or more of the corrugations so that there would not be uniformity of protection of the corrugations, thereby allowing certain corrugations to be distorted. Deformation of a single convolution of a bellows changes the operating characteristics of the valve, rendering it useless.

Another attempt to protect the bellows against deformation by abnormal differentials in pressure is that disclosed in U.S. Patent No. 2,339,487, issued to William R. King, on January 18, 1944, wherein an external valve is provided to close off the exterior of the bellows when the valve is in full open position. Such means proved unsuccessful by reason of the fact that the external valve would not always seal due to the presence of trash and foreign material in the well fluid. Thereby, such protection means was undependable.

Another means proposed to protect bellows against abnormal differentials in pressure consisted of sectional clamps placed about the outer sides of the corrugations. This means did not afford dependable protection, because the exterior clamps protected the bellows convolutions only from outward radial deformation, and did not protect them against axial deformation. Where exterior clamps are used, the walls of the convolutions of the bellows are moving away from the exterior clamps upon axial expansion of the bellows, and hence could not afford protection.

The means and method afforded by this invention protects the bellows corrugtions from both radial and axial deformation when subjected to excessive differentials in pressure.

A specific object of the invention is to provide a flow valve with internal bellows protective rings of incompressible material which will protect the bellows against collapse resulting from abnormal differentials in pressure, but which will allow unhampered operation of the valve through normal pressure ranges.

The rings may be pre-formed and placed in the bellows corrugations, either at the time of manufacture or afterward, or the rings may consist of low melting point metallic material, such as lead or babbitt, which is placed in the bellows in molten state and deposited in the corrugations by centrifugal force or otherwise, and allowed to cool into rings conforming to the shape of the corrugations.

A still further object of this invention is to provide protection means for a bellows diaphragm which will permit the bellows to be subjected to abnormally high pressure differentials for testing without damage to the bellows and without changing the operating characteristics thereof. This is important in that it will disclose weaknesses in the bellows before they are put into use, and eliminate the necessity of "ageing" the bellows after charging.

A further object is to provide positive protection means for bellows used in a pressure charged flow valve which permits the use of effective pressures in a well in carrying out acidizing and hydraulic fracturing operations while the flow valves are in the well, without danger of changing the operating characteristics of the valves.

Other and further objects of this invention will become apparent upon reading the detailed specification hereinafter following, and by referring to the drawings annexed hereto and made a part hereof.

In the drawings:

Fig. I is a cross-sectional elevational view of a pressure loaded flow valve employing a bellows diaphragm therein with the outer convolutions thereof protected by reinforcing rings of the type herein described.

Fig. II is an enlarged fragmentary side elevational view of a section of the bellows diaphragm shown in Fig. I, in contracted position, showing the outer convolutions of the bellows being protected by the incompressible rings disposed therein.

Fig. III is a sectional view taken on the line XIII—XIII of Fig. I.

Fig. IV is a sectional view taken on the line XIV—XIV of Fig. I.

Fig. V is a cross-sectional elevational view of a typical bellows diaphragm in normal relaxed position, showing a modified form of ring reinforcement disposed in the inner channels formed by the outer corrugations.

Fig. VI shows a modified split wirelike ring which may be placed in the inner channel formed by the outer corrugations of the bellows shown in Fig. V.

Numeral references are employed to designate the various parts referred to in the drawings, and like numerals designate like parts throughout the various figures of the drawings.

In Figures I–IV is shown a flow valve having a hollow cylindrical head 100 which forms a pressure chamber 101 therein.

A threaded concentric passage 102 is provided through the upper end of the head 100, through which passage the chamber 101 and the bellows 1 may be charged with gas at a predetermined pressure. After charging, a plug 103 is threaded into the passage 102, such plug having a wrench-engaging head 104 thereon. The head 104 is turned downwardly into compressive engagement with a resilient seal 105 to seal and maintain the pressure in the chamber 101 and the bellows 1.

The head 100 has an externally threaded skirt 106 of reduced diameter thereon to which is threadedly engaged a cylindrical hollow bellows casing 107 by means of companion threads 108.

A perforated spider or partition 109 is secured on the inner side of the extension 106, such perforated spider having annularly spaced passages 110 therethrough.

A central bore 111 extends through the spider 109, which serves as a guide for the movable bellows core 112. The movable bellows core has an enlarged portion extending through the bellows 1, having four flat sides 113 thereon, and four rounded corners 114. The flat sides 113 permit the gas to easily pass into the bellows when charged.

A cylindrical extension 115 of reduced diameter is provided on the upper end of the bellows core. Such cylindrical extension 115 slidably extends through the central hole 111 in the spider 109.

A stop head 116 is secured to the upper end of extension 115. The stop head 116 is engageable with the upper face of the spider 109 to limit the extension of the bellows 1. This permits the bellows casing 107 or the valve stem 127 to be removed while the bellows is charged without danger of damage to the bellows by overextension. The bellows core 112 is terminated at its lower end by an enlarged cylindrical shoe 117. The skirt 6 on the lower end of the bellows 1 is turned downwardly over the shoe 117 and welded and sealed thereto. The skirt 5 on the upper end of the bellows 1 is turned over the lower end of the spider 109, which extends slightly below the extension 106, and is welded and sealed thereto.

It will be noted that the inner channels 4, formed by the outer corrugations 2 of the bellows 1, are filled by rings of incompressible supporting material like that hereinbefore described, which protects the corrugations of the bellows against distortion when subjected to abnormal pressure differentials.

A valve housing 120 is threadedly engaged to the lower end of the bellows casing 107 by companion threads 121. The valve housing 120 has a plurality of lateral flow ports 122 arranged through the sides thereof through which pressure fluid injected into the annulus between a casing (not shown) and a well tubing (not shown) may be admitted to the outer side of the bellows diaphragm 1 to contract the bellows diaphragm when such injected pressure is greater than the charged pressure in the bellows.

A concentric flow passage 123 is provided through the valve housing 120 and a valve seat 124 is arranged about the upper end of such passage 123.

Exterior threads 125 are formed on the lower end of the valve housing 120 for threadedly engaging the valve to a check valve or a passage leading to the inner side of a well tubing, as is well known in the art.

A valve stem 127 has a threaded extension 128 on the upper end thereof, which is threadedly engaged in the threaded recess 129 provided on the lower face of the shoe 117. The valve stem 127 has a round valve head 130 thereon which seats against the valve seat 124 to control the flow of fluid through the passage 123. The valve head 130 is normally urged against the seat 134 by the pressure charged in the bellows 1, thereby normally closing the passage 123. When sufficient pressure is injected in the annulus between a casing and a tubing in a well to overcome the pressure charge inside the bellows, the bellows will be caused to contract, thereby lifting the valve head 130 off the seat 124, permitting the injected pressure fluid to flow through the passage 123 into the well tubing to lighten the fluid therein and lift it to the surface. When the injected pressure is lowered below the charged pressure in the bellows, the bellows will again extend and cause the valve head 130 to engage the seat 124 and close the passage 123.

As hereinbefore explained, the bellows 1 can only contract until the outer corrugations 2 of the bellows come into contact with the rings 13; and when the corrugations come into contact with the rings 13, the incompressible material of the rings 13 prevent the corrugations of the bellows from further collapsing and being distorted, even when subjected to extreme pressure differentials. The rings 13 conform to the shape of the corrugations when contracted to maximum extent, thereby preventing any distortion of the contracted corrugations of the bellows.

It will be noted that the pressure in the chamber 101 and inside the bellows 1 is equalized at all times through the perforations 110. The perforations 110 are always open, regardless of the position of the bellows.

When the material is solidified into the rings 13 in the flow valve above described, the upper face 118 of the enlarged portion of the bellows core 112 is preferably in contact with the spider 109, thereby establishing the ultimate compression of the bellows, as illustrated in Fig. II. When the flow valve is assembled and the bellows 1 is charged, the bellows is extended just short of the complete relaxed condition when the valve head 130 seats against the valve seat 124. Such extension is maintained by the interior charge in the bellows. However, the inherent spring tension in the bellows will allow the bellows to be contracted upon being subjected to an external pressure greater than the internal pressure, to thereby permit the opening of the valve.

Therefore, in operation, the bellows 1 is free to flex and cause the valve to open through the full stroke, determined by the standoff space between the upper face 118 of the core 112 and the spider 109. At such maximum stroke the upper face 118 of the core 112 is in contact with the spider 109, and the bellows is compressed substantially as illustrated in Fig. II, with the corrugations being supported by the rings 13. In the event of abnormally high differentials in pressure across the bellows, either accidentally, or in carrying out well operations such as acidizing or hydrafracing, the corrugations of the bellows will be supported and reinforced by the rings 13 against such abnormally high differentials in pressure, and will not be deformed or damaged by such pressure. Upon the release of such abnormal pressure differential, the bellows will be free to flex and operate to control the valve without any change in the operating characteristics of the valve.

The rings 13 give positive protection to the bellows, and such protection is not affected by temperature changes, defective seals and other variations in conditions occurring while the valve is in use, as was the case with previous bellows protection devices.

The solid ring employed for protecting the outer corrugations 2 of the bellows against undue distortion and damage may take other forms than that heretofore disclosed, although the ring 13, formed to the shape of the convolutions of the bellows, is preferable.

A modified form of reinforcing ring is disclosed in Figs. V and VI, wherein is shown a plurality of split rings 132 which are substantially round in cross-section, one of said rings 132 being disposed in each of the inner channels 4 formed by the outer corrugations 2 of the bellows 1.

The split rings 132 are preferably made of spring-like material so that they may be compressed (as indicated in broken lines) for placing in alignment with the channels 4 and then released to spring into the channels. However, the rings 132 could simply be made of wire which could be placed in the channels 4 to protect the convolutions 2 against collapse.

The rings 132 could of course be formed in many different ways. For instance, they could be molded or cast and placed in the convolutions of the bellows, either during manufacture of the bellows, or after the manufacture thereof. The rings could be made of any suitable material such as metal or plastic.

Furthermore, reinforcing rings in the shape of rings 13 could be made of spring-like material and split like ring 132 and placed in the channels 4 by contracting them and releasing them in the channels.

It will be apparent that the method and apparatus herein disclosed and claimed is subject to modification, and could take other forms than that specifically disclosed, and still remain within the spirit and scope of the appended claims.

We claim:

1. In a pressure responsive valve, a pressure chamber; a bellows chamber attached to the pressure chamber; a partition between the pressure chamber and the bellows chamber, said partition having a central bore and a plurality of radially spaced passages therethrough; a bellows diaphragm suspended to the partition and extending into the bellows chamber; a shoe member closing the free end of the bellows; a guide stem attached to the shoe and extended upwardly through the bellows and having a part slidably extending through the bore in the partition; and means on the guide stem engageable with the lower side of the partition to limit the contraction of the bellows.

2. The combination called for in claim 1 wherein the means for limiting the contraction of the bellows consists of a shoulder on the guide stem spaced from the partition a predetermined distance depending upon the desired limitation of the contraction of the bellows.

3. The combination called for in claim 1 with the addition of an enlarged head on the upper end of the guide stem above the partition, and engageable with the partition to limit the extension of the bellows.

4. The combination called for in claim 1 with the addition of rings composed of low melting point metallic material disposed in the inner corrugations of the bellows.

References Cited in the file of this patent

UNITED STATES PATENTS

| | | |
|---|---|---|
| 1,561,065 | Eggleston | Nov. 10, 1925 |
| 2,052,043 | Weaver | Aug. 25, 1936 |
| 2,323,985 | Fausek | July 13, 1943 |
| 2,368,999 | O'Leary | Feb. 6, 1945 |
| 2,465,060 | Carlisle et al. | Mar. 22, 1949 |
| 2,507,347 | Myers | May 9, 1950 |
| 2,610,644 | Carlisle | Sept. 16, 1952 |
| 2,670,509 | Hadley | Mar. 2, 1954 |
| 2,670,511 | Hadley | Mar. 2, 1954 |
| 2,685,886 | Peters | Aug. 10, 1954 |
| 2,731,977 | McGowen | Jan. 24, 1956 |
| 2,762,392 | Reese | Sept. 11, 1956 |
| 2,781,565 | Atchinson | Feb. 19, 1957 |
| 2,797,700 | McGowen | July 2, 1957 |

FOREIGN PATENTS

| | | |
|---|---|---|
| 620,372 | Germany | Oct. 19, 1935 |